Dec. 18, 1956   L. E. PULVER   2,774,171
FISHING LURE
Filed April 20, 1955

INVENTOR
Lynn E. Pulver
BY Robert U. Geib, Jr.
ATTORNEY

United States Patent Office 2,774,171
Patented Dec. 18, 1956

2,774,171

FISHING LURE

Lynn E. Pulver, Swea City, Iowa

Application April 20, 1955, Serial No. 502,600

6 Claims. (Cl. 43—42.19)

This invention relates to fishing lures, and more particularly to a device of the type described which provides greater attraction to fish.

It is one of the objects of the present invention to provide a fishing lure of the type employing a spoon, but wherein the spoon provides a wobbling action, as distinguished from complete rotation.

Another object is the provision of a device of the class described which may be easily and inexpensively manufactured.

A preferred embodiment of my invention is described as hereinafter set forth in the specification and illustrated in the accompanying drawing wherein Figure 1 is a perspective illustrating a complete device which has been constructed in accordance with the teachings of the present invention;

Figure 1:
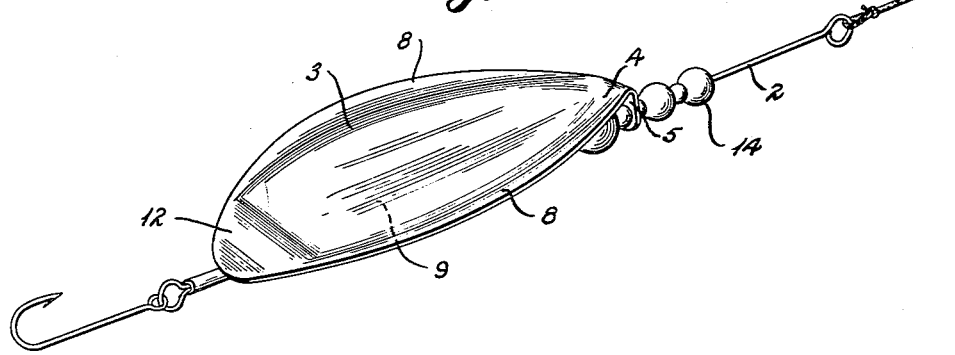
Figure 2:
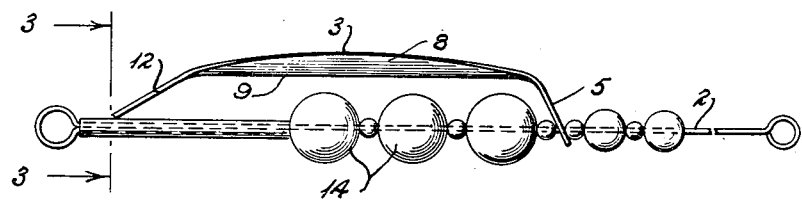
Figure 2 is a side elevational view of my improved device.
Figure 3:
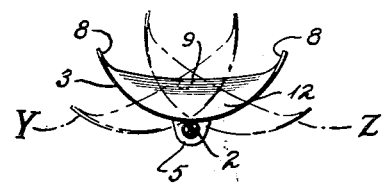
Figure 3 is a sectional view taken on the line 3—3 of Figure 2.

Referring more particularly to the drawing, the numeral 2 illustrates a shaft or stem of wire on which the blade or spoon 3 of the present invention is mounted.

The blade or spoon 3 is elliptical in shape (when viewed in plan), and is provided with a narrow end 4 which carries an integrally formed lip 5 which is shown as extending at an angle of approximately 85° with respect to the major axis of the blade or spoon 3. This lip 5 is provided with a hole 6 through which the stem or wire shaft 2 extends.

As shown in the drawing, the outer face of the blade or spoon 3 is transversely concave, as illustrated at 8, with the underside thereof being convex, as shown at 9.

Another important feature of the blade or spoon 3 is that its end which is remote from the lip 5 is considerably broader; and the tip thereof is bent at approximately 25° toward the stem or shaft 2. The foregoing construction and arrangement permits the blade or spoon portion 3, when pulled through water, to assume a wobbling action, but not complete rotation; and I have found that this wobbling action has a greater attraction to fish than would otherwise be the case.

This wobbling action is illustrated in dotted lines at the positions indicated at Y and Z, the same being about the axis of the shaft or stem 2 as the lure is dragged through the water.

That portion of the stem or shaft 2 which is adjacent the free end of the blade or spoon 3 may carry one or more hooks to which there may be applied a fly, streamer, pork rind, minnows, worms, feathers, etc.

The other end of the stem or shaft 2 is connected to the fishing line; and both above and below the lip 5 of the blade or spoon 3, the usual beads 14 may be applied to the stem or shaft 2 in the manner familiar to those skilled in the art.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A fish lure adapted to be connected intermediate a fish hook and a fishing line, said device comprising a blade provided with an integrally formed lip member which extends angularly with respect thereto, said lip member having a hole therethrough, a shaft extending through the hole in said lip member, the outer surface of said blade being transversely concave and the inner surface thereof being transversely convex, the tip of the free end of said blade extending angularly toward said shaft.

2. A fish lure adapted to be connected intermediate a fish hook and a fishing line, said device comprising a blade provided with an integrally formed lip member which extends angularly with respect thereto, said lip member having a hole therethrough, a shaft extending through the hole in said lip member, the outer surface of said blade being transversely concave and the inner surface thereof being transversely convex, the tip of the free end of said blade extending angularly bent toward said shaft, the outer free end of said blade being of greater width than said lip member.

3. A fish lure adapted to be connected intermediate a fish hook member and a fishing line, said device comprising a blade provided with an integrally formed lip member which extends angularly with respect thereto, said lip member having a hole therethrough, a shaft extending through the hole in said lip member, said blade being substantially elliptical in plan with the outer free end thereof of greater width than said lip member, the outer surface of said blade being transversely concave and the inner surface thereof being transversely convex, the tip of the free end of said blade extending angularly toward said shaft.

4. A fish lure adapted to be connected intermediate a fish hook and a fishing line, said device comprising a blade provided with an integrally formed lip member which extends at approximately a 85° angle with respect thereto, said lip member having a hole therethrough, a shaft extending through the hole in said lip member, the outer surface of said blade being transversely concave and the inner surface thereof being convex, the tip of the free end of said blade extending angularly toward said shaft.

5. A fish lure adapted to be connected intermediate a fish hook and a fishing line, said device comprising a blade provided with an integrally formed lip member which extends at approximately a 85° angle with respect thereto, said lip member having a hole therethrough, a shaft extending through the hole in said lip member, the outer surface of said blade being transversely concave and the inner surface thereof being transversely convex, the tip of the free end of said blade extending angularly toward said shaft, the outer end of said blade being of greater width than said lip member.

6. A fish lure adapted to be connected intermediate a fish hook member and a fishing line, said device comprising a blade provided with an integrally formed lip member which extends at approximately a 85° angle with respect thereto, said lip member having a hole therethrough, a shaft extending through the hole in said lip member, said blade being substantially elliptical in plan with the outer free end thereof of greater width than said lip member, the outer surface of said blade being transversely concave and the inner surface thereof being transversely convex, the tip of the free end of said blade extending angularly toward said shaft.

References Cited in the file of this patent

UNITED STATES PATENTS

| | | |
|---|---|---|
| 1,376,934 | Greene | May 3, 1921 |
| 2,551,127 | Hesse | May 1, 1951 |
| 2,698,494 | Larsen | Jan. 4, 1955 |